Jan. 26, 1926.  1,571,092
J. LALLY
CONNECTION FOR BUILDING COLUMNS
Filed July 20, 1925   2 Sheets-Sheet 1
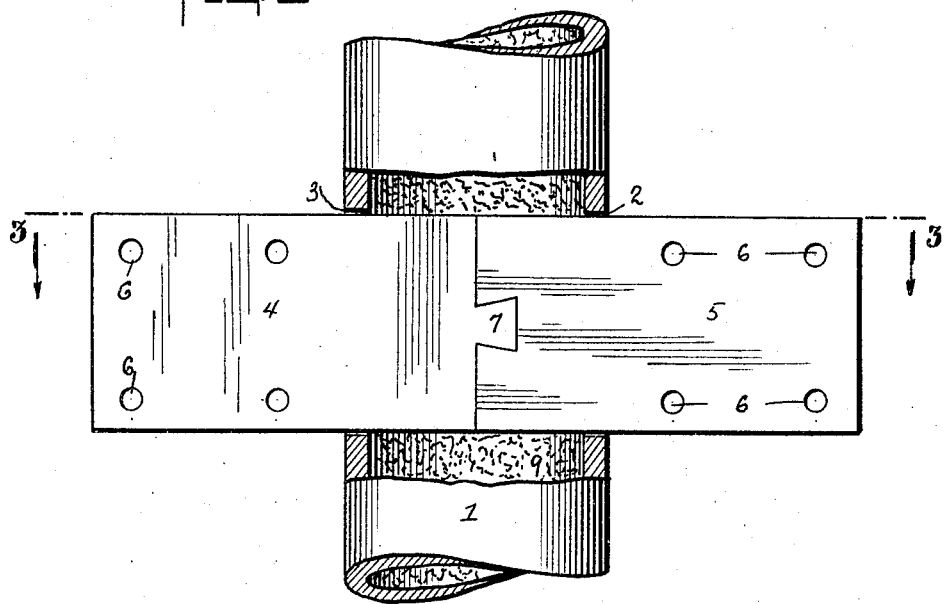
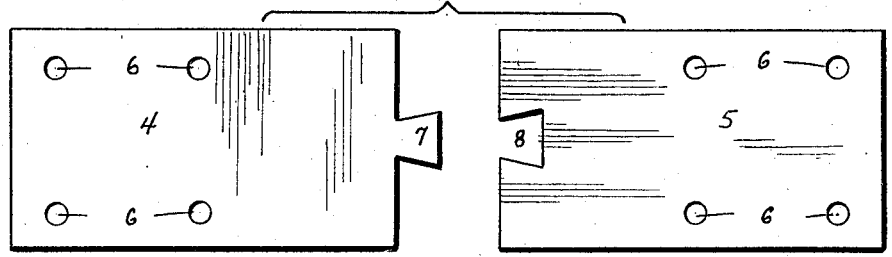
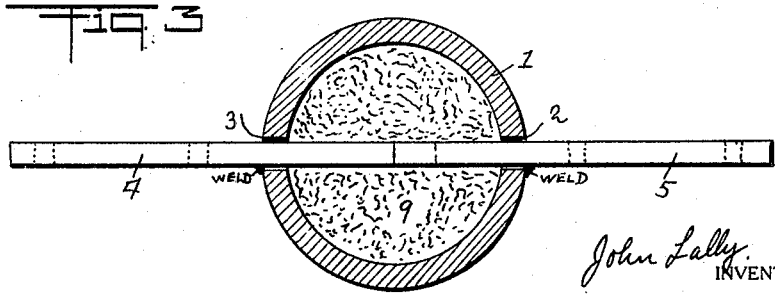
John Lally
INVENTOR
BY
Robert B. Kilgore
ATTORNEY Jan. 26, 1926.
J. LALLY
1,571,092
CONNECTION FOR BUILDING COLUMNS
Filed July 20, 1925    2 Sheets-Sheet 2
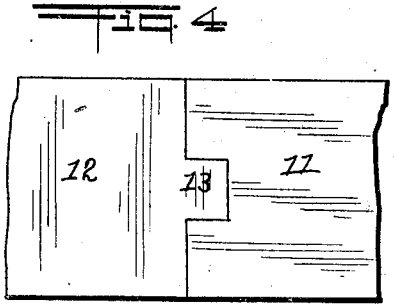
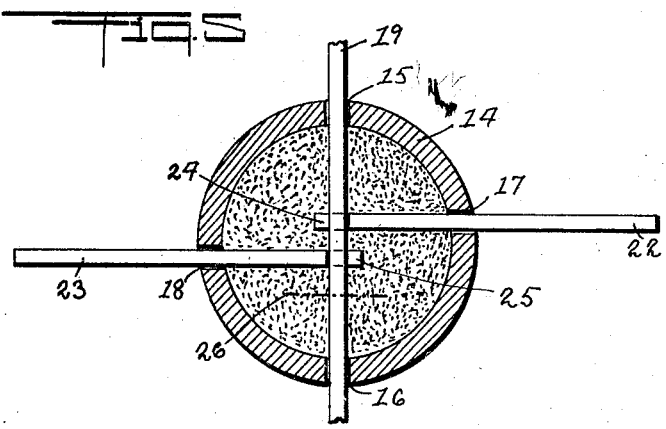
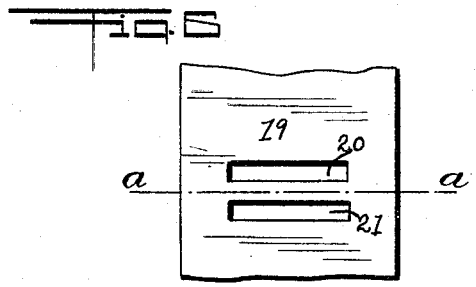
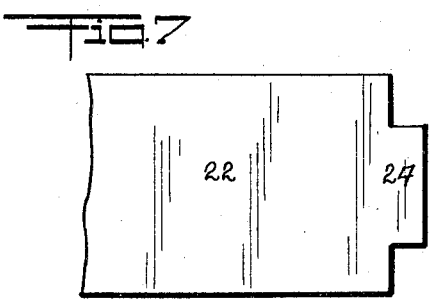

Patented Jan. 26, 1926.

1,571,092

UNITED STATES PATENT OFFICE.

JOHN LALLY, OF GREAT NECK, NEW YORK.

CONNECTION FOR BUILDING COLUMNS.

Application filed July 20, 1925. Serial No. 44,892.

*To all whom it may concern:*

Be it known that I, JOHN LALLY, a citizen of the United States, residing at Great Neck, in the county of Nassau and State of New York, have invented certain new and useful Improvements in Connections for Building Columns, of which the following is a specification.

My invention relates to improvements in beam connections for building columns and it is my object to so construct the connections that the parts may be entered into the column from both sides, in which the connection plates will be solidly locked together inside the column, which can be made of small pieces of plate which would otherwise be scrap, which will not tend to yield, loosen or pull out under load and which can be quickly assembled by unskilled labor.

Heretofore the connections have been inserted into the column through a slot in the wall of the casing and held in place by the plastic material within the casing. In some cases the connections have been welded to the slot edges. My invention consists in dovetailing the connections together by mortise and tenon joints so that they cannot yield or loosen under load.

In the drawing Fig. 1 is a side view, partly in section, of my improved connection for two-way construction; Fig. 2 is a side view of the two connection plates; Fig. 3 is a sectional view of the structure of Fig. 1 on the line 3—3 thereof; Fig. 4 is a view of a square mortise and tenon connection instead of the dove-tail of Figs. 1, 2 and 3; Fig. 5 is a top view, partly in section, of a four-way connection; Fig. 6 is a side view of the central portion of the long connection shown in Fig. 5; and Fig. 7 is a view of the end of a short connection showing the co-operating tenon.

In the two-way connection shown in Figs. 1, 2 and 3 the structure consists of a hollow casing 1, having opposed slots 2 and 3 in its walls. The connections consist of two flat plates 4 and 5 provided with rivet or bolt holes 6. One of the connections 4 has a tenon 7 on its inner end and the other connection 5 has a counterpart or mortise 8 cut in its inner end.

Each connection is introduced into the casing through its slot and the mortise and tenon are interlocked within the casing, after which the casing may be filled with plastic material 9 to hold it in place and strengthen and fireproof the column. If desired, the connections may be welded to the slots to hold them in place, in which event the plastic material is not necessarily used.

In Fig. 4 I have shown how the connection between the two plates may be effected by a square mortise and tenon instead of the dovetail of Figs. 1, 2 and 3. This square mortise and tenon will resist vertical strains as well as the dovetail connection but is not quite as efficient in resisting direct outward pulls.

In Figs. 5, 6 and 7 I have shown how a four-way connection may be made with mortise and tenon connections for the plates. The casing 14 has opposed slots 15 and 16 in its wall and slots 17 and 18 slightly staggered with respect to the casing axis.

A through, or long connection 19, provided with mortises 20 and 21 on either side of the axial line a—a is pushed through the slots 15 and 16 so that the mortises lie opposite the slots 17 and 18. The short connections 22 and 23, each provided with a tenon 24 and 25 on their inner ends are then inserted through the slots 17 and 18 with the tenons 24 and 25 engaging the mortises 20 and 21 in the through connection 19.

If a three-way connection is desired the slot 18, connection 23 and mortise 20 may be omitted.

If a two-way connection at right angles is desired the slots 16 and 18 and connection 23 may be omitted in which case the connection 19 is cut off at the line 26.

The mortises and tenons may be cheaply and quickly punched out of the plate connections and when the two are interlocked within the casing there is no chance for either of them to yield under load as they mutually support one another.

I claim:—

1. A two-way connection for building columns comprising two plates each adapted to enter an opposed slot in a column casing, one of which is provided with a mortise and the other of which is provided with a tenon, the mortise and tenon being adapted to interlock within a column casing whereby the two plates are locked together.

2. A building column comprising a casing provided with opposed slots, a beam connection in each of said slots, one of which is provided with a mortise and the other of which is provided with a tenon, the two being interlocked within the casing.

3. A building column comprising a casing provided with opposed slots, a beam connection in each of said slots, one of which is provided with a mortise and the other of which is provided with a tenon, the two being interlocked within the casing and a filling of plastic material within the casing embedding the mortise and tenon joint.

4. A building column comprising a casing provided with opposed slots, a beam connection in each of said slots, one of which is provided with a mortise and the other of which is provided with a tenon, the two being interlocked within the casing, the slot edges and side walls of the connections being welded together.

5. A building column comprising a casing provided with slots, a beam connection in one of said slots having a mortise therein and a second beam connection in another of said slots, a tenon thereon engaging the mortise on the first connection within the casing.

6. A building column comprising a casing provided with opposed slots, a beam connection therein provided with a mortise located within the casing, a third slot in the casing between the first two, a beam connection therein and a tenon thereon engaging the mortise within the casing.

7. A building column comprising a casing provided with opposed slots, a beam connection therein provided with mortises on either side of the column axis, another pair of opposed slots in the casing alining with the mortises, a beam connection in each of said slots and a tenon on the end of each of said connections engaging a mortise within the casing.

In testimony whereof I have affixed my signature.

JOHN LALLY.